United States Patent
Hayball et al.

(10) Patent No.: US 6,308,174 B1
(45) Date of Patent: Oct. 23, 2001

(54) METHOD AND APPARATUS FOR MANAGING A COMMUNICATIONS NETWORK BY STORING MANAGEMENT INFORMATION ABOUT TWO OR MORE CONFIGURATION STATES OF THE NETWORK

(75) Inventors: Clive Colin Hayball, Sawbridgeworth; Gillian Barbara Kendon, Bishops Stortford; Dennis Stewart William Tansley, Braintree; Andrew Tunnicliffe, Sawbridgeworth; John Ian Turner, Fowlmere; David Stephen Riches, High Wycombe; John Gavin L'Estrerange Shurmer, Cuffley, all of (GB)

(73) Assignee: Nortel Networks Limited, St. Laurent (CA)

( * ) Notice: Subject to any disclaimer, the term of this patent is extended or adjusted under 35 U.S.C. 154(b) by 0 days.

(21) Appl. No.: 09/072,811

(22) Filed: May 5, 1998

(51) Int. Cl.[7] .................................................. G06F 15/173
(52) U.S. Cl. ............................ 707/10; 707/101; 709/220; 709/223
(58) Field of Search ................ 707/10, 101; 395/200.53, 395/200.59, 200.31; 370/400; 709/220, 223

(56) References Cited

U.S. PATENT DOCUMENTS

| | | | |
|---|---|---|---|
| 5,299,207 | 3/1994 | Fujii | 371/29.1 |
| 5,751,964 * | 5/1998 | Ordanic et al. | 709/224 |
| 5,796,736 * | 8/1998 | Suzuki | 370/399 |
| 5,936,941 * | 8/1999 | Kondo et al. | 370/242 |
| 5,970,064 * | 10/1999 | Clark et al. | 370/351 |
| 6,006,019 * | 12/1999 | Takei | 709/203 |

FOREIGN PATENT DOCUMENTS

| | | |
|---|---|---|
| WO 97/23099 | 6/1997 | (WO) . |
| WO 97/23974 | 7/1997 | (WO) . |
| WO 97/31451 | 8/1997 | (WO) . |
| WO 98/00954 | 1/1998 | (WO) . |

* cited by examiner

Primary Examiner—Jean R. Homere
(74) Attorney, Agent, or Firm—Lee, Mann, Smith, McWilliams, Sweeney & Ohlson

(57) ABSTRACT

A method of managing a communications network is described which makes use of information about the current state of the network and in addition, information about past and/or future states of the network. Information about the current state of the network is stored in a management information base (MIB) and the information about the past/future states is either stored in this MIB, or separate past/future MIBs are created. The information about the past/future states is stored in a way such that it can be operated on in the same way as the information about the current state of the network. By storing the information in this way management of the network is improved. For example, future states of the network can be tested before being implemented. Also, information about past states can be used to predict future states. Fault management, configuration management, accounting management and performance management can all be improved by using the information about past/future states.

15 Claims, 9 Drawing Sheets

METHOD AND APPARATUS FOR MANAGING A COMMUNICATIONS NETWORK BY STORING MANAGEMENT INFORMATION ABOUT TWO OR MORE CONFIGURATION STATES OF THE NETWORK

BACKGROUND OF THE INVENTION

1. Field of the Invention

This invention relates to a method and apparatus for managing a communications network and particularly, although not exclusively, for managing a telecommunications network.

2. Description of the Prior Art

Communications network management is a difficult and complex task and yet it is very important that a communications network should be managed well. Good management enables costs to be kept to a minimum whilst at the same time ensuring that all the required services are provided and that the quality of service is high. Communications network management includes organisational and administrative tasks such as planning for the future and upgrading the network to cope with predicted future demands. Also, faults in the network have to be dealt with and the network maintained and monitored. Communications network management also includes operating the network and modifying or adapting it for specific purposes as these arise as well as detecting and preventing fraudulent use of the network.

Typically a network management system is used to help manage a communications network. The network management system is usually an integral part of the communications network and is used to monitor and make changes to the network.

One problem with known network management systems is that planning and implementing upgrades for the network can be difficult. For example, when a network upgrade is planned this is typically done using off-line software tools. That is, the planning process takes place separately from the communications network itself. When the upgrade is being planned it is difficult to "test" different solutions because the planning process is separate from the network management system itself.

Once the network operator has finalised the new upgrade design the upgrade can be implemented by actually installing or modifying the communications equipment and then updating the MIB model of the network. Some pieces of equipment or hardware, when installed into the network, will automatically be identified by the network. In this case the MIB can be updated automatically. However, when this does not occur, for example if the upgrade involves software, the MIB has to be manually updated by the network operator and this is time consuming and prone to errors. The wrong information may be supplied to the MIB or there may actually have been an error involved with installing the equipment. This makes it very difficult to verify that the upgrade has been completed successfully.

Often the impact of an upgrade is great and, in order to reduce this impact, the upgrade is carried out in several incremental steps. This is called pre-provisioning. When pre-provisioning is used the problems of upgrading (as described above) are repeated and this can lead to a build up of errors that are consequently more difficult to put right.

Network management also involves monitoring performance of the network and trying to predict future requirements. This also applies for network upgrades where it is required to predict the effect that the proposed upgrade will have on the network performance. Another problem is that network managers often need to carry out detailed "what if" testing, for example to study the effect of a particular component failing with respect to the services that can be provided.

FIG. 7 illustrates a prior art situation. A MIB 701 containing information about the current state of a network and equipment 703 within the network was available within a communications network management system. In order to analyse the current MIB 701 analysis tools 702 were provided which were used to operate directly on information from the MIB 701. This enabled analysis concerning the current state of the network to be obtained. However, for other analyses, involving information about past or future states of the network (and its equipment 703), information from the current MIB 701 had to be translated or transformed 706 before being stored. The translated or transformed data from the current MIB 701 was stored in one of a number of different types or kinds of data store 704. Then, in order to analyse the data from one of the stores 704, individual analysis tools 705 were used. For each type of store 704 a particular type of analysis tool 705 was required. For example, these tools 705 could be generic tools such as Microsoft Excel, which were capable of analysing many different types of information. However, these generic tools had to be adapted in order to enable them to be used with a particular store 704. It was also possible to use specific analysis tools 705, for example, "bespoke" tools, specially created for a particular task.

A number of problems exist with this prior art method. A translation or transformation 706 is required and this is time consuming, complex and can introduce errors. It is not possible to obtain the analysis in real time because this translation or transformation process 706 is time consuming. Also, the analysis obtained using the analysis tools 705 is "one step" removed from the actual MIB information and this can lead to errors of interpretation. A further problem, is that it is very difficult to test planned or future versions of the MIB using this prior art method. Also, many forms of analysis are not available using the prior art method, because analysis tools for these tasks are not available or because future versions of the MIB are required to carry out the analysis.

Theoretically, a complete record could have been retained of a MIB and stored. This stored information could then have been analysed at a later date using the analysis tools 702. However, this method is impractical because the complete MIB, once stored, could not be analysed using the analysis tools 702 without reloading the MIB and restoring it to a working condition. Such a process would be complex and time consuming as well as impractical; the current MIB would essentially have to be replaced by the "past" or stored MIB before the stored MIB could be analysed using the analysis tools 702.

It is accordingly an object of the present invention to provide an apparatus and method for managing a communications network which overcomes or at least mitigates one or more of the problems noted above.

SUMMARY OF THE INVENTION

According to a first aspect of the present invention there is provided a method of managing a communications network comprising the steps of:

(i) storing management information about a first state of the network;

(ii) storing management information about at least one other state of the network in the form of information about relationships between the states;
(iii) analysing the first state by inputting stored management information about the first state into an analyser; and
(iv) analysing the other state(s) using said analyser and the information about the relationships between the states(s).

The invention also encompasses a corresponding communications network management system comprising:
(i) a memory arranged to store information about a first state of the network;
(ii) a memory arranged to store information about at least one other state of the network in the form of information about relationships between the states; and
(iii) an analyser arranged to analyse the first state by accepting inputs comprising stored management information about the first state; and wherein said analyser is arranged to analyse the other state(s) using the information about the relationships between the states.

According to another aspect of the invention there is provided a corresponding communications network comprising a communications network management system of the invention as described above.

This provides the advantage that information about past and/or future states of the network can be stored as well as information about the current state and this information can all be made available in a manner such that all the information can be used in the same type of method. For example, this is very useful if it is desired to predict future requirements of the network. Information about the current and past states of the network can be used to predict future requirements accurately. Also, if it is desired to plan upgrades for the network, then planned future configurations can be stored and then tested by carrying out the same operations on these as would be carried out on the current network.

Preferably, the information about a first state of the network is stored in a first management information base and the information about at least one other state of the network is stored in a second management information base. This provides the advantage that the information is stored in a format and structure that is suitable for use in a network management system. Also, two management information bases are used which makes the method simple to implement and use.

In another embodiment it is preferred that the information about a first state of the network, and the information about at least one other state of the network, is stored in a management information base. This has the advantage that one management information base is used to store the information. This has the advantage that only one structure is used to store the information and this can be simple to implement and use in some circumstances.

Preferably, said information about at least one other state of the network is encoded as a difference from the information relating to another state. This has the advantage that the amount of information that is to be stored is reduced so that the amount of memory needed is reduced.

Advantageously, said information about a first state of the network comprises information about the current configuration of the communications network and said information about at least one future state of the network comprises information about a planned future configuration of the communications network. This enables the information to be easily used for managing the configuration of a communications network. For example, information about a planned future configuration of the communications network can be operated on for testing purposes, in the same way as information about the current configuration of the network.

DETAILED DESCRIPTION OF THE INVENTION

Figure 1:
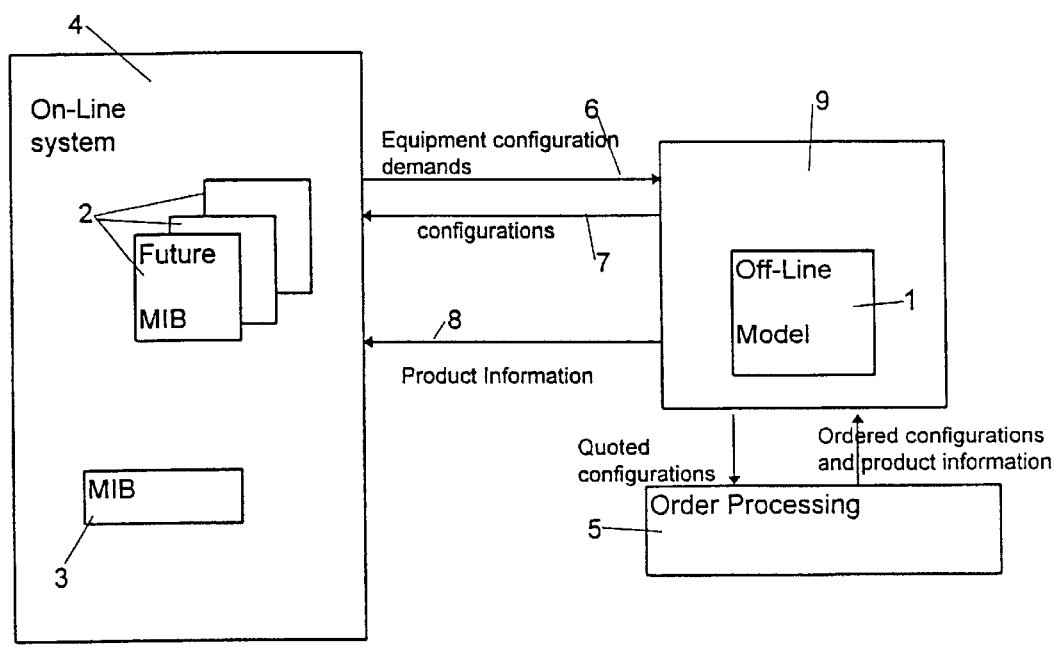
FIG. 1 is a general schematic diagram of an arrangement for population of a planned "future" management information base (MIB).

Embodiments of the present invention are described below by way of example only. These examples represent the best ways of putting the invention into practice that are currently known to the Applicant although they are not the only ways in which this could be achieved.

DEFINITIONS

Management Information Base (MIB)

A management information base is a collection of management information that is arranged so that it is suitable for use by a network management system. The management information may be stored in a database format although this is not essential. The management information comprises any data or information suitable for use in managing a communications network. For example, information about the performance of components in the network; information about faults in the network and information about the configuration of the network.

The information stored in a MIB is management information and this comprises information about the network elements that are to be managed. The network elements that are to be managed are represented as objects. These objects comprise structures that are formed from sets of attribute value pairs. For example, a MIB identifies information about the configuration of the network that is being managed (i.e. what components there are in the network and how they are connected) and it may also provide information about the performance of the network (e.g. the number of packets that have been transferred between two entities in the network). A MIB may also contain information about each network management user's ability to access elements of the MIB. For example, user A might have read-only capabilities to a MIB, while another user may have read/write capabilities.

Associated with a MIB is a management information model (MIM) or management information tree (MIT). The management information model defines the structure or format for the management information to be stored within the database itself.

A network management operator typically uses the MIB to make changes to the network and to obtain information about the network. However, the operator does not operate directly on the MIB. A network management protocol such as SNMP is used to obtain information from or make changes to the MIB.

Configuration of a Communications Network

The configuration of a communications network comprises information about the network components and how these are connected together. This includes information about the topology of the network.

Information about the State of the Network

Information about the state of the network includes information about any aspects or features of the network and its use. For example, information about the configuration of the network, or information about the performance of the network (for example information about the number of communications that are being made). Information about the state of the network can also include information about faults. Information about a past state of the network comprises information about any aspects or features of the network and its use at a time before the present time (e.g. 2 weeks ago). Information about a future state of the network comprises planned or predicted information about any aspects, features or use of the network.

"On-line" and "Off-line"

Figure 6:
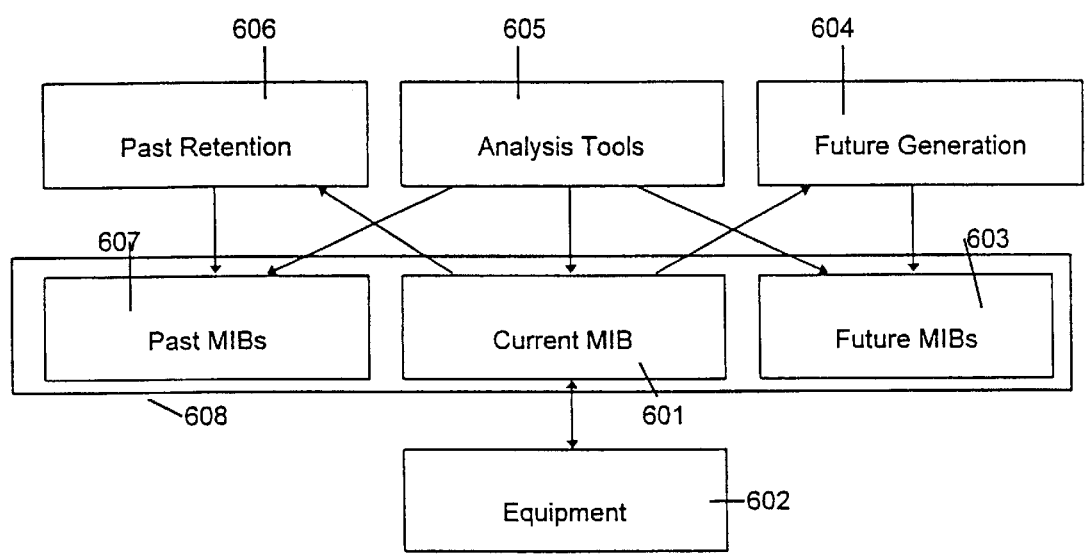
FIG. 6 is a general schematic diagram of the use of past, future and current MIBs in communications network management.
Figure 7:
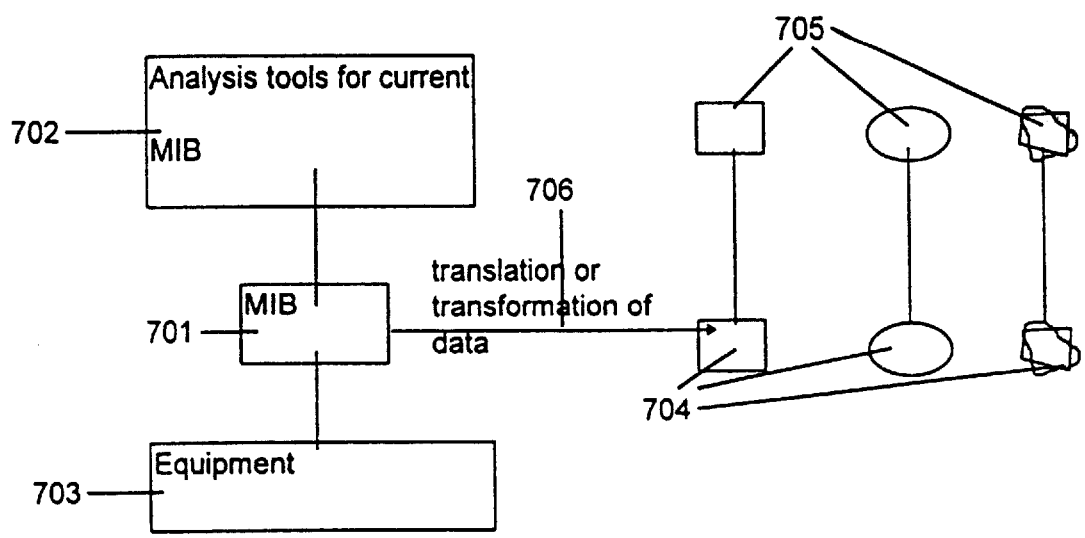
FIG. 7 illustrates a prior art method for obtaining an analysis about past or future states of a communications network.

The term "on-line" is used to refer to applications, functions or actions which operate on the current representation of the communications network being changed, or on the communications network itself. On-line applications, by operating on a current MIB or other current representation, can affect the state of the communications network. "Off-line" application, functions or actions are those which will not have a direct effect on the communications network being managed. FIG. 6 shows a communications network management system 608 comprising:

(i) a memory 601 arranged to store information about a first state of the network 602;

(ii) a memory (which can be any or all of 601, 603 or 607) arranged to store information about at least one other state of the network in the form of information about relationships between the states; and (iii) an analyser 605 arranged to analyse the first state 602 by inputting stored management information about the first state into the analyser 605; and wherein said analyser 605 is arranged to analyse the other state(s) using the information about the relationships between the states(s).

FIG. 6 is a schematic diagram of a communications network management system 608. A management information base 601 is provided that contains management information about a communications network 602. This management information base 601 can be analysed using analysis tools 605 that can either be part of the management information system (i.e. on-line) or can be off-line applications. The MIB 601 effectively contains a model of the current communications network 601 and the network operator can interrogate and analyse the model of the network by using the analysis tools 605. However, for many tasks the network operator needs to take account of future forms that the network will take or past states of the network, in order to manage the network effectively. In order to aid the network management process, "future" generation tools 604 are used to create models for predicted or planned future states of the network and these are stored in a memory 603. The "future" generation tools 604 may be off-line tools or they may be an integral part of the communications network management system 608. Similarly, past retention tools 606 are provided which enable information about past states or forms of the network to be stored in a memory 608. The information about the past or future states is stored in the form of information about relationships between the states. For example, instead of storing three future MIBs, one for each of three future states of the network, it is possible to store only the differences between each MIB and the current MIB 601. Alternatively, differences between consecutive MIB can be stored. The information can also be stored in the form of other relationships between states. Any suitable relationship can be used. By storing information about relationships between states rather than information about each state itself, the amount of information required to be stored is reduced. This provides the advantage that less storage capacity is required and also processing times to manipulate the data are reduced because of the reduced size of the data.

The analysis tools 605 are used to analyse the current MIB 601 as already mentioned, and also to use information from the stored "past MIBs" 607 and the stored "future MIBs" 603. The information from the stored "past MIBs" 607 is stored in the form of information about relationships between states of the network. This information is retrieved from the "past MIBs" 607 in such a way that the analysis tools 605 are operable on both the current MIB 601 and the past MIBs 607. Similarly, for the future MIBs 603, information is stored in the form of information about the relationships between states. This information is retrieved from the future MIBs 603 is such as way that the analysis tools 605 can operate on it. This enables the network operator to take past and future information into account when performing network management tasks. This can be done simply, effectively and quickly. Also, the results obtained from the analysis tools 605 are comparable no matter whether the analysis was for the past, current or future MIB data.

Information from the current MIB 601 can be used by the past retention tools 606 and the "future generation tools" 604 to form the past or future MIBs. Similarly, information from the past MIBs 607 can be used by the "future generation tools" 604 to form the future MIBs 603.

The information about the current state of the network is stored in the current MIB 601 and the information about any past or future states (607, 603) can either be stored separately from the current MIB 601 or as part of the current MIB 601. (Although the past 607 and future 603 MIBs are shown as separate from the current MIB 601 in FIG. 6, this is not essential.)

The analysis tools 605 incorporate a retrieval mechanism arranged to make the stored information available such that operations that can be carried out on the information about the current state can also be carried out on the information about the other state(s). This means that the method for using the past and future MIBs is the same as for the current MIB 601.

FIG. 1 illustrates an example of using the invention to facilitate the planning of future network upgrades. The upgrade process is greatly simplified by using one or more "future" MIBs 2. Using an off-line system 9 the network operator develops an off-line model 1 that describes the operator's planned future network (i.e. the result of the upgrade). Information about the future configurations is supplied from the off-line model 1 to one or more of the future MIBs 2. The future MIBs 2 are incorporated into the network management system 4 together with the current MIB 3. In this way, information from the off-line model 1 is entered into a future MIB 2 and can be tested. Operations can be performed on the future MIBs 2 in the same way as operations are performed on the current MIB 3. This means that the "planned" upgrade configuration can be tested in an extremely effective way before it is implemented. The future MIBs 2 may be reviewed and adapted as a result of the tests or for other reasons. Then when it is required to upgrade the network, the current MIB is either replaced by the appropriate future MIB 2 or updated using information from the future MIB. This process is automated so that the risk of errors being introduced into the MIB 3 as a result of the upgrade process is reduced.

FIG. 1 also shows how order processing information 5 can be supplied to the off-line system 9 and used to help plan the off-line model 1. For example, the order processing information 5 can include information about available products, delivery times, planned product releases, prices, replacement and withdrawal of equipment components and other factors. Future MIBs 2 may be automatically updated in response to evolving product release dates and information using the information 5 that is provided to the off-line system 9.

Information about the current network is used to obtain information about hardware and delivery date requirements. This information 6 is supplied to the off-line system 9 in order that an upgrade can be planned.

Figure 2:
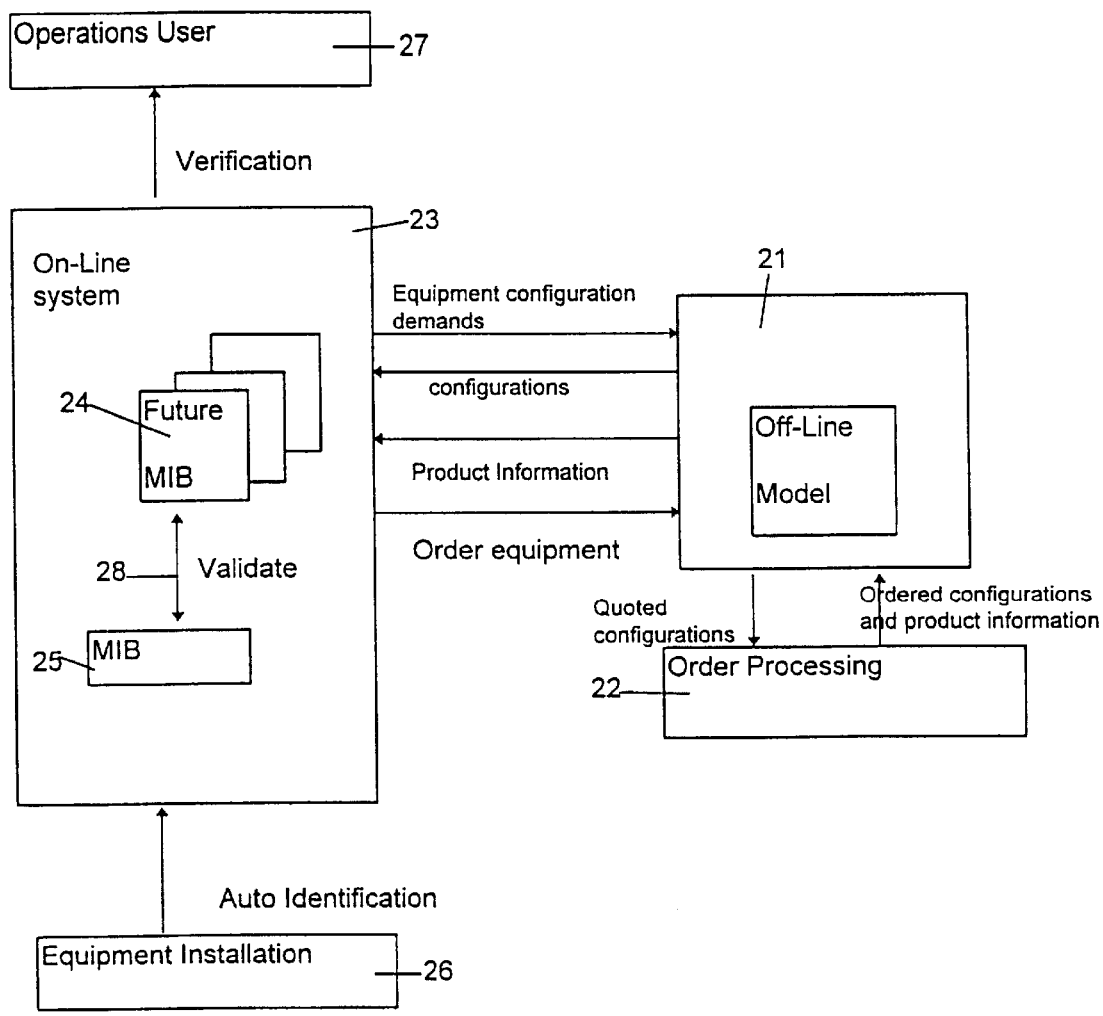
FIG. 2 is a general schematic diagram indicating how installation validation is completed using "future MIBs".

Another advantage of using the future MIBs 2 is illustrated in FIG. 2. Here future MIBs 24 are used to validate the upgraded network. For example, a network upgrade is planned using an off-line system 21 and the results provided to a future MIB 24. The planned upgrade is tested using the future MIB 24 and any revisions made as required. Then the upgrade is effected, for example, by installing new hardware 26. The new hardware, when installed is typically automatically identified by the network management system 23 and current MIB 25; then checks can be made against the future MIB 24 as illustrated by arrow 28. If the wrong hardware has been installed then the operations user 27 is informed and the correct replacement can be ordered immediately. Also, if an installation error has occurred, then the engineer can be immediately notified to correct the error.

Figure 3:
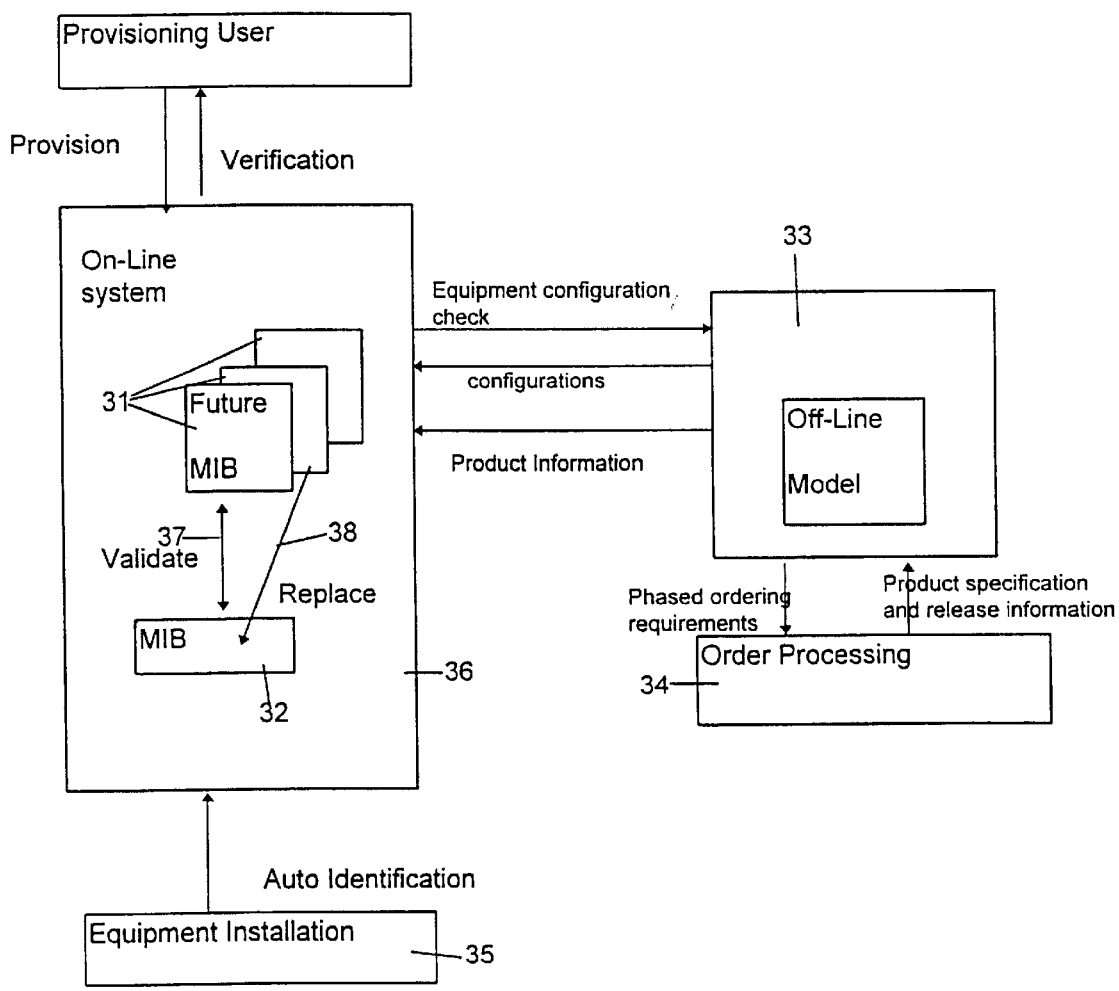
FIG. 3 is a general schematic diagram indicating how phased pre-provisioning is effected using "future MIBs".

FIG. 3 illustrates the situation when several future MIBs 31 are used to enable phased pre-provisioning to be used. During phased pre-provisioning, several incremental upgrades are made instead of one upgrade which would otherwise have a drastic effect.

Information about product specifications and release dates are provided to the off-line system 33 by the order-processing system 34. This information is used to create a series of upgrade models that are recorded in future MIBs 31. The first phase of the upgrade is initiated following the first future MIB. Equipment is installed 35 and this is automatically detected by the network management system 36 and current MIB 32. The new installation is verified 37 against the appropriate future MIB 31 and the upgrade continues. In one example, successful verification results in the automatic exchange 38 of a pre-configured future MIB 31 with the current on-line MIB 32 making equipment and services immediately available.

Figure 4:
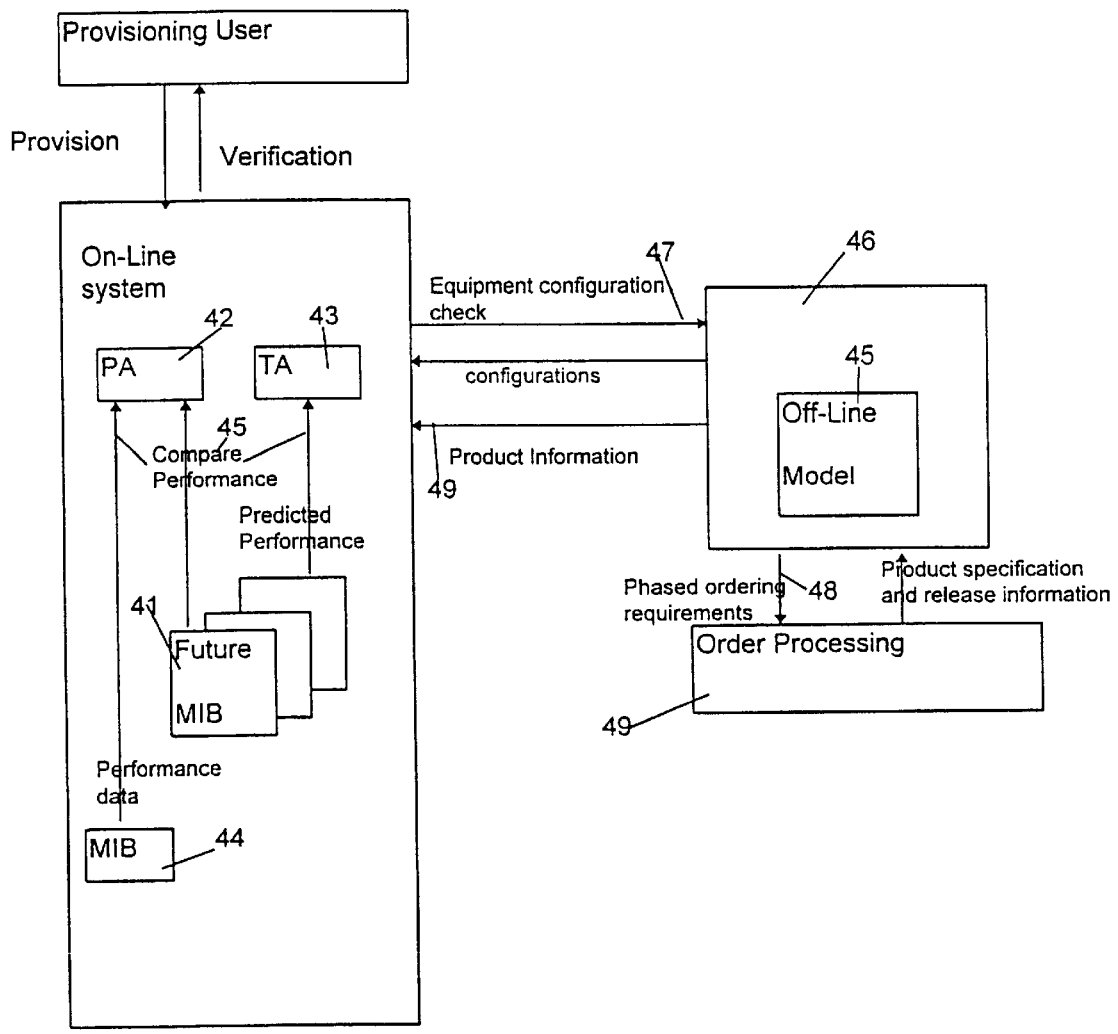
FIG. 4 is a general schematic diagram of an example of how future MIBs are linked to performance and trends analysis applications.

FIG. 4 shows how the future MIBs 41 can be linked to performance analysis 42 and trends analysis 43 applications. The trends analysis application 43 provides predictions of future equipment requirements. Information about these requirements is transferred 47 to the off-line system 46 and used 48 to order the necessary equipment using the order processing system 49. The off-line system uses the information about the requirements to make a future MIB or MIBs 41. The future MIB 41 is then tested in the following way. The performance of the current network is monitored by taking information from the current MIB 44 and analysing this using a performance analysis application 42. The predicted performance of the future MIB is provided by the trends analysis application 43 and then a comparison is made 45. The actual performance of the network is compared against the predicted performance from the future MIB 41. According to the results of the comparison the future MIB can be modified and in this way an iterative process can be followed to find an acceptable solution. Cost of deployment 49, provided by the off-line system, is taken into account and may be a pertinent factor in finding an acceptable solution.

Figure 5:
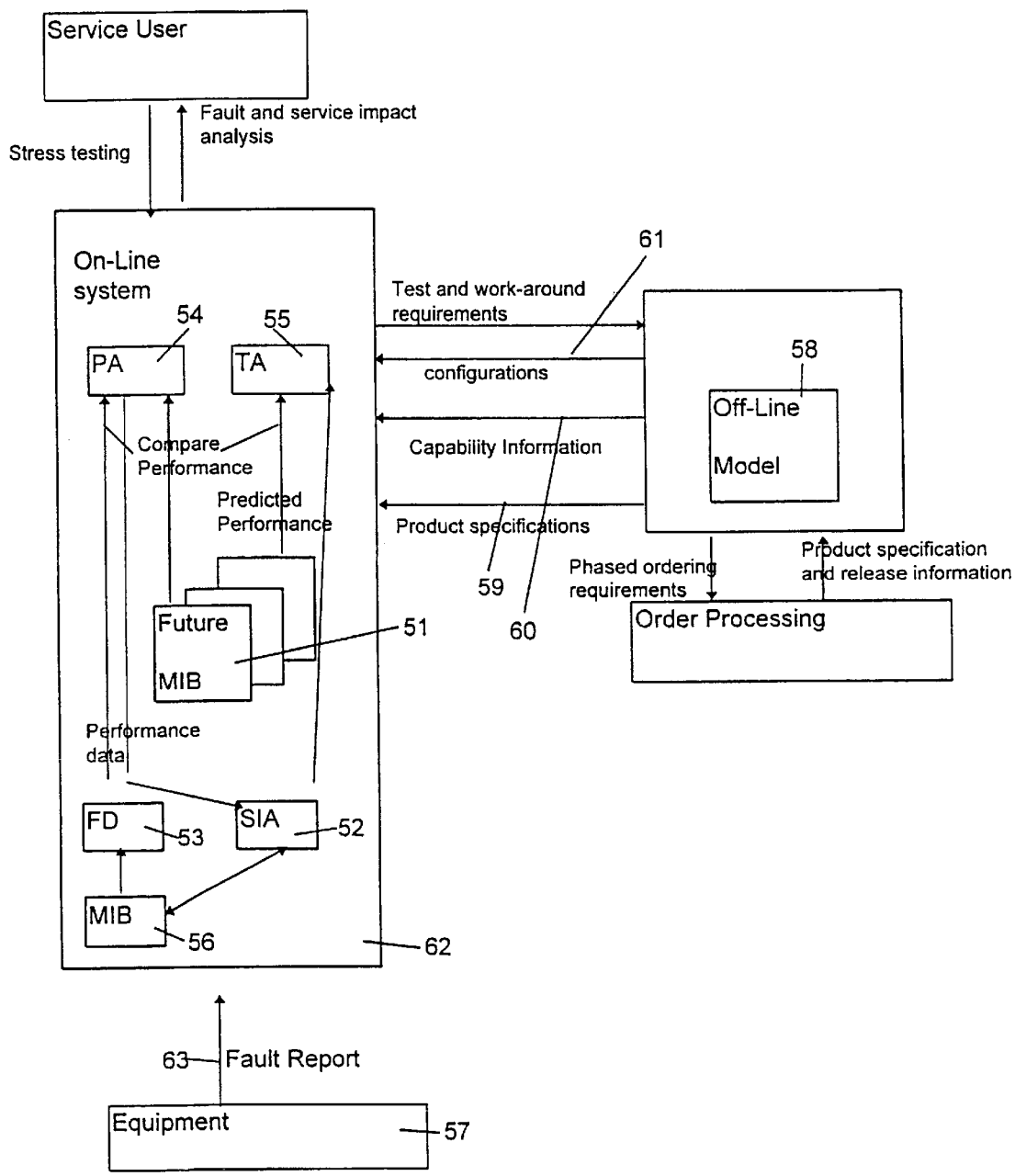
FIG. 5 is a general schematic diagram of an example of how future MIBs are linked to service impact analysis and fault diagnosis applications.

FIG. 5 shows how the future MIBs 51 can be used in conjunction with a service impact analysis application 52. This has the advantage that the operator can obtain a detailed cost/benefit analysis for various components in the network. The service impact analysis application 52 provides information about what effect on services and customers will result if a given piece of equipment fails or changes. By using the service impact analysis application 52 the future MIBs can be tested to see how they would perform in situations where particular component(s) fail. The user can engage in detailed cost/benefit analysis iterations to achieve a desired level of reliability against the cost of provisioning (i.e. the hardware cost versus potential loss of service costs and penalties).

Using the off-line system 58, models are created of possible future communications network configurations 61 and information about product specifications 59 and capability information 60 is passed to the communications network management system 62. In a situation where certain equipment 57 in the actual communications network fails, a fault report 63 is provided to the communications network management system 62. This fault report 63 is used in conjunction with information from the current MIB 56 by a fault diagnosis application 53. This provides a diagnosis of the fault at the equipment level (i.e. the fault report is converted into information about which piece of equipment has a fault). The fault diagnosis is provided to a performance analysis application 54 which provides a performance analysis at the service level (i.e. the effect of the fault on services is determined). As already mentioned a service impact analysis application 52 is provided. This uses information from the performance analysis application 54 about the effect of the fault on services and in turn, it provides information to the trends analysis application 55 and also to the service user.

Performance Management

The invention can also be used to facilitate performance management. Performance management involves ensuring that a communications network remains accessible and uncrowded so that it can be used efficiently. With poor performance management a communications network can become overtaxed by the increasing demands of users. Individual components in the network become congested and this reduces the performance of the network. Performance management comprises:

collecting and storing performance data;
understanding the stored data and identifying problems in performance;
identifying solutions to the problems; and
and implementing the solutions.

Figure 8:
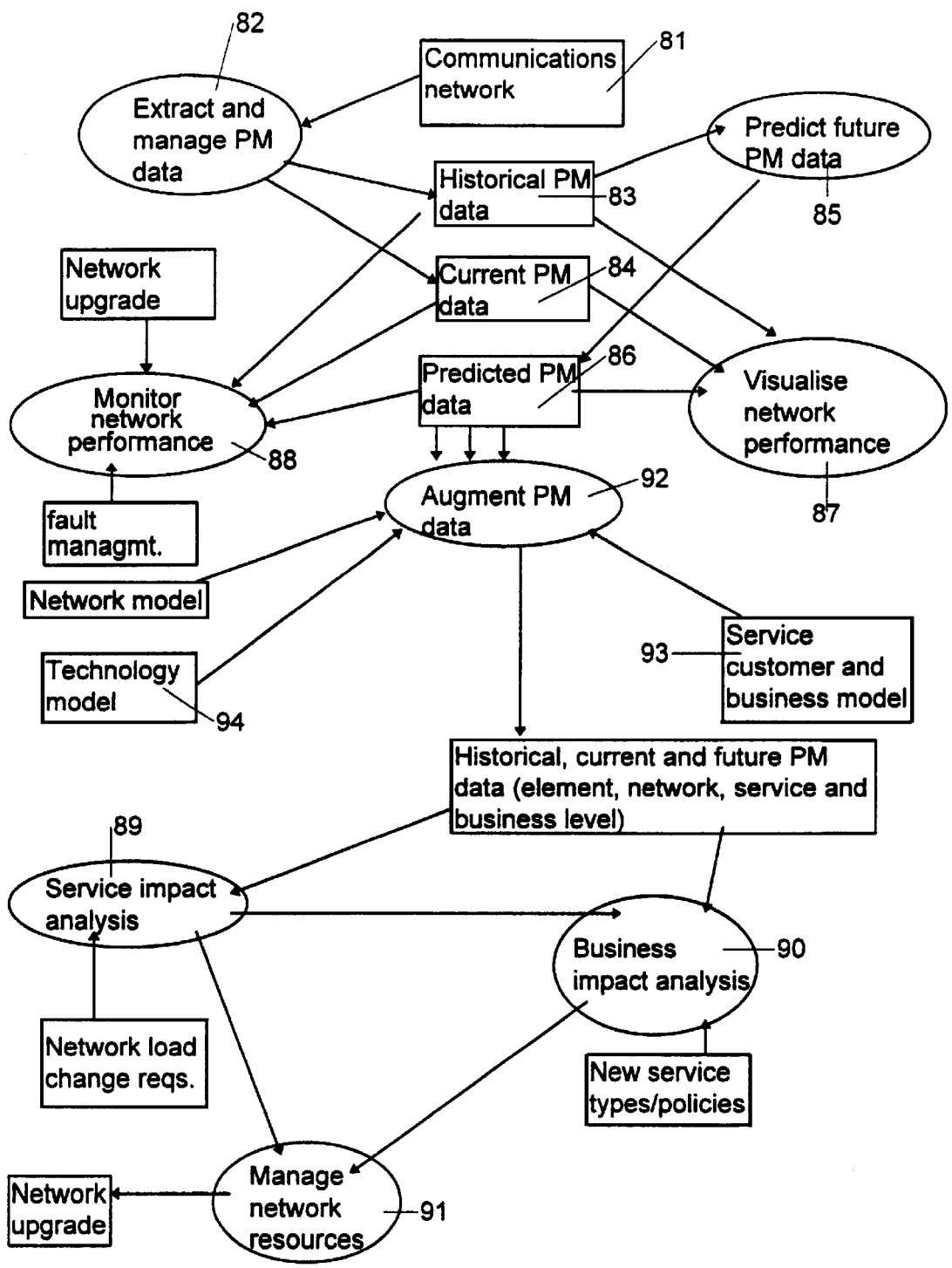
FIG. 8 shows an example of use of the present invention to facilitate performance management in a communications network.

FIG. 8 shows an example of using the present invention to facilitate performance management. Performance management data is extracted from a communications network 81 by a process or system 82. This data is stored to form historical performance management data 83 or current performance management data 84. The historical performance management data 83 is then used by a prediction process 85 which generates predicted performance management data 86. This predicted data 86 comprises information about a future state of the network 81. The historical 83, current 84, and future 86 data are stored in a memory which may be a management information base. This information 83, 84, 86 is management information about consecutive states of the network 81 and it may be stored in the form of relationships between the states. For example, the historical data 83 can be stored as differences between consecutive states. By storing information about relationships between the states it is possible to reduce the amount of data that is to be stored. All the data, 83, 84 and 86 is analysed by the same analysis tool(s) 87, 88, 89, 90, 91, 92. For example, analysis tools to visualise the network's performance 87 are used to analyse the historical 83, current 84 and predicted 86 data. This provides the advantage that all the data can be analysed using the same tool without the need to transform or translate the data first. The data can also be augmented 92 by adding information about services and customers for example, or information about new technology 94. Service impact analysis 89 tools and business impact analysis 90 tools can also be used to analyse all the data 83, 84 and 86.

FIG. 8 represents a performance management system. Each item represented in FIG. 8 as an "oval" shape represents a process and each item represented between two horizontal lines represents a data store. Each process may comprise other processes and each data store may comprise other data stores.

As mentioned above, information from a communications network 81 is extracted and managed by a process 82. There are several key elements to this process 82: data extraction, data mapping, data requirements specification and data warehousing.

Data Extraction

Element level data is extracted from different types of equipment in the network 81. This equipment is distributed geographically and different network elements employ different mechanisms for giving the network management system access to their performance parameter readings. The streams of data originating from each network element are consolidated into an overall logical performance management data store, 83, 84, 86. The data extraction process 82 supports specific data requests such as data pertaining to a particular network component or time period. The process 82 is also able to handle clashes between requests and also limitations in the underlying equipment's data provision. For example, a particular device may only support a restrictive periodic polling.

Data Mapping

The extract and manage performance management data process 82, also maps element level data obtained from the network 81, to network level semantics. For example, individual queue cell discard readings are summed to obtain a cell discard reading for a whole switch. Element level performance management data is important for detailed analysis of local behaviour, and network level performance management data is important for analysis of the wider network's behaviour. The mappings act as unifying functions that allow comparable performance indicators to be given for different equipment types. In this way, performance data is used to gain an understanding of the performance of a network even though the network is based on elements that have different architecture and behaviour.

Data Requirements Specification

It is possible for users to specify performance management data requirements. For example, this can be done using a user interface that enables a model of the network to be navigated in a layered fashion. This provides a context for the user to select performance measures. Another example is for a three-dimensional graphical representation of the network 81 to be provided. This helps the user to see relationships between elements in the network and to develop task or role oriented approaches to forming data requests.

Data Warehousing

The data management process 82 has an architecture to facilitate the bringing together of different data sources and provides a set of services to manage that data. Historical performance management data 83 is valuable because it is used to predict the future behaviour of the network 81. It is also used in the analysis of current behaviour of the network 81.

The historical performance management data 83 is used to predict future performance management data using process 85. By a process of trends analysis it is possible to predict certain performance parameters for a network 81. Hidden in the vast quantity of performance management data are patterns that are interpolated into the future. An example is an increase in traffic from one network location to another. This is be difficult to identify manually because the traffic volume may vary widely in the short term, or may change balance between alternative routes between the two locations.

Typically it is costly in terms of processing time to make predictions based on sophisticated technologies, and therefore predicted performance management data 86 is advantageously stored for some period of time. This enables predicted performance management data 86 to be supplied immediately to data consumers.

The performance management data 83, 84 and 86 is stored in such a way that it can all be analysed using the same analysis tool. For example, the visualise network performance process 87 can be used. In one example this comprises a traditional data graphing tool and a data animation tool. Another tool that can be used is the monitor network performance tool 88. This tool 88 makes the user aware of performance problems and poor use of network resources. For example, it can comprise a trigger monitor and an anomaly detector. A trigger monitor enables users and applications to specify triggers which are sets of performance parameter thresholds. The anomaly detector enables users and applications to monitor for anomalous patterns in the performance management data 83, 84, 86.

The performance management data 83, 84, 86 is augmented with information, for example, about services and customers 93, to enable it to be used by other analysis tools such as a service impact analysis tool 89 and a business impact analysis tool 90.

An example of use of the performance management system shown in FIG. 8 is now described. The user specifies a far ranging set of performance triggers in the monitor network performance process 88. These instruct the performance management system to proactively raise an alert when a trigger is fired. For example, the user specifies an envelope of acceptable performance parameters for a backbone of switches and interconnecting links in the network 81. In the situation that these envelopes are exceeded an alert is raised.

In this example, when the alert is raised, congestion at a switch has occurred. The cause is identified by analysing the element level parameters for the switch. The user specifies a performance management data request that retrieves performance parameters for three hours starting from the hour previous to the alert. This uses historical 83 and current 84 performance management data. The user is then able to graph the data in order to analyse it.

A second example is now described that relates to resolving a long term performance problem. By analysing historical data 83 the user identifies that a particular backbone switch is often congested. Using the data grapher the user is able to ascertain that the problem is due to congestion on an egress port of the switch fabric card. Using a data animation tool the user identifies a peak time of 4 pm when large volumes of traffic converge on the switch. Then, using the service impact analysis tool 89, the user identifies that the majority of the large number of connections flowing through the switch belong to two customers. Each customer is operating within their defined Service Level Agreement, but at 4 pm both use their maximal mode, concentrating too much traffic through the particular switch. Using the business impact analysis tool 90, it is found that both companies are large banks, downloading the day's transactions to the clearing house agency electronically. The user decides to explore solutions by rerouting one of the customer's circuits to avoid the congested switch.

Fault Management

Figure 9:
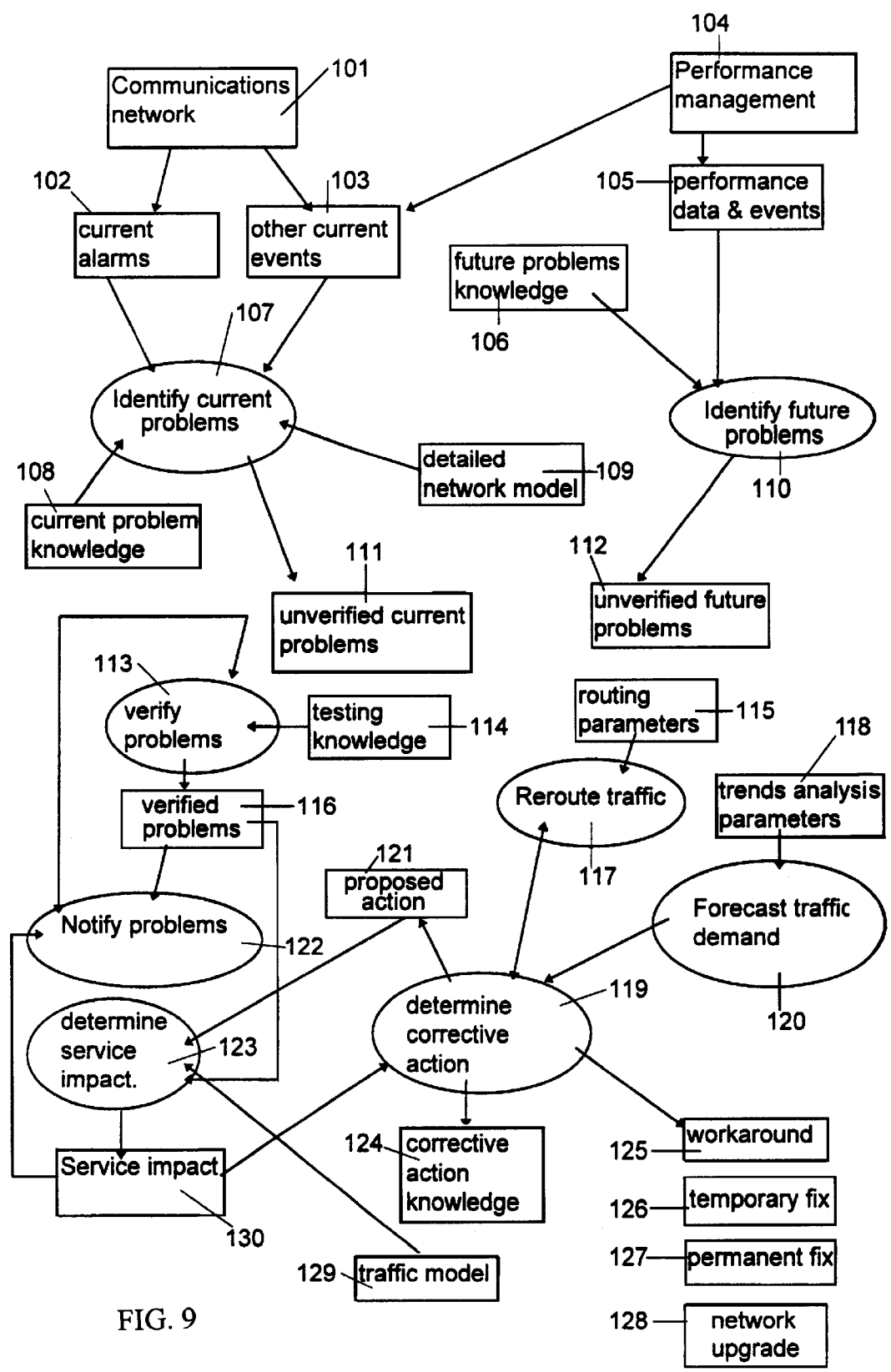
FIG. 9 shows an example of use of the present invention to facilitate fault management in a communications network.

Fault management is concerned with:

recognition, localisation and verification of problems arising within a network. These problems can be currently-occurring faults or predicted faults.

understanding the impact of those faults, current and predicted deciding what to do about the faults permanently fixing the faults. FIG. 9 illustrates at a high level the main processes and data stores within a fault management system. Each process is represented by a bubble in FIG. 9 and may comprise further processes. Similarly, the data stores, represented by parallel lines, may comprise further data stores.

Alarms 102 and other events 103 are passed from a network 101 to a process 107 which identifies more abstract states in the network 101 called problems 111. Such problems may be output to the operator or other agents at this stage. Optionally, a separate process 113, which can include performing tests on the network 101, will first verify the correct identification of problems 111.

A parallel process 110 is concerned with the early identification of problems in the network 101 before those problems 112 actually occur—a form of fault prediction. Unverified future problems 112 are considered in the same way as current problems 111 and are processed further in the same way.

Following identification and verification, problems 116 are passed to a process 123 which determines their impact on the current or future services running over the network 101, and these impacts are passed to the notify process 122 as additional information.

Finally, problems are passed to a process 119 which determines an appropriate corrective action 125,126, 127, 128. Such actions can be workarounds 125 (involving no correction), temporary fixes 126 (a short-term correction) or permanent fixes 127 (a long-term correction). The process 119 makes its decision/recommendation on the basis of analysing various traffic rerouting options (using the reroute traffic process 117), taking into account service impact 130 and future traffic demands 120.

In order to identify problems 111, which are an abstract description of what precise thing or things are wrong with the network 101, the identify current problems process 107 needs to access a detailed model of the network 109, and knowledge 108 which relates events 103 and network connectivity to problems 111. The model of the network 109 needs to be detailed in that precise interconnectivity and containment information is needed in order to determine accurately and precisely what the problem is. Equally, this information must be up to date. For example, the detailed network model 109 can be a MIB containing management information about the network 101. The problem knowledge 108 has to be specific to the type of network 101 involved (although there are some general rules it can contain), and may need updating over time as the network evolves (such as due to the addition of new equipment capabilities).

The typical realisation of the identify current problems process 107 is with a correlation function. Diverse patterns of events 103 are analysed against each other, a rulebase 108, and the network topology (connectivity) 109, in order to generate a problem stream 111 of high level descriptions of the network state rather than the low level events 103, 102.

The identify future problems process 110 uses information about current performance data and events 105 from a performance management system 104. Information about the current state of the network 101 is also used, for example, from the detailed network model 109. Also, information about past states and performance of the network 101 can be used (not shown in FIG. 9). The information about past states is stored according to the present invention so that analysis tools such as the identify future problems tool 110 can be used both on the information from the detailed network model 109 and the information about the past states.

The current and future problem identification processes 107, 110, identify problems that are unverified 111, 112. This is because these processes are necessarily limited by the quality of the information available to them from within the network 101, and additional information, available externally or via specialised tests, is required to establish their accuracy. The verify problems process 113 is an optional step available to do this. Its primary function is to manage such tests, either supporting the operator in an advisory capacity; or selecting, implementing and establishing the results of the tests entirely automatically. This process 113 is supported by specialised knowledge 114 about selecting and implementing network tests.

The notify problems process 122 is concerned with the delivery of problem notifications and other associated information (such as service impacts) to external clients of the fault management system. For example, the client may be a user interface application or another type of application.

The determine service impact process 123 is concerned with the assessment of the impact of known problems on the services running across the network 101. It does this by knowing which service uses which part of the network 101 and looking up the mapping between problems associated with specific network resources and how those resources are used by the services. A more advanced technique is optionally used, which involves the derivation of this mapping knowledge with the process itself through investigative tests on the network. Actual service impact can be compared with theoretical service impacts by using this process 123. This technique is also known as service impact analysis.

Once determined, the impact information 130 is passed to the notify process 122 and/or used in the determine corrective action process 119. The determine service impact process 123 is supported by a traffic model 129 which knows the mapping between services and network resources (planned or current).

The determine corrective action process 119 is concerned with deciding, or supporting the operator in making decisions, as to the appropriate corrective action to take for a given problem state (i.e. set of problems, current or future).

The determine corrective action process 119 uses three support processes, determine service impact 123, reroute traffic 117 and forecast traffic demand 120. Its result is of three types, workarounds 125 which involve no fix of the problem, temporary fixes 126 which patch the problem, and permanent fixes 127 which restore or overcome the problem.

The reroute traffic process 117 tries out various reallocation (rerouting) of traffic across the network in hypothetical situations, one of which represents the actual situation in the network. This process 117 involves testing future models of the network. Advantageously, the present invention is used to store management information about the future states of the network 101. This stored information is then analysed using the same tools as are available for analysis of the current management information.

The forecast traffic demand process 120 is used to take into account the future traffic demands to be placed across the network 101 in various hypothetical configurations. In this way the durability of a temporary 126 or permanent 127 fix is assessed. Management information about future states of the network is stored according to the present invention and used during this analysis.

The invention encompasses situations in which the analyser 605 or analysis tools are "on-line" or "off-line" for each of fault management, configuration management, accounting management, performance management and security management.

A range of applications are within the scope of the invention. These include situations in which it is required to manage a communications network and where information about at least two other states (such as a past or future states) of the network are required. For example, the invention may be used for configuration management, for example, to plan and implement network upgrades. The invention may also be used to facilitate fault management, to facilitate network performance management to facilitate accounting management and to facilitate security management, all for communications networks.

What is claimed is:

1. A method of compressing management information in a communications network comprising the steps of:
   (i) storing first management information in a first format, the first management information representing a first configuration state of the network;
   (ii) automatically generating difference information representing the differences between the first configuration state and a second configuration state of the network, the difference information being generated without user intervention; and
   (iii) storing management information about the second configuration state of the network in the form of said difference information;
   whereby the cumulative volume of data represented by the first management information and the difference information is reduced relative to the volume of data which would be required to store management information for the first and second configuration states using only the first format.

2. A method according to claim 1, including the step of storing more than two configuration states of the network by storing a respective set of difference information for each configuration state other than the first configuration state.

3. A method according to claim 1, wherein the first management information is stored in a first management information base and the difference information is stored in a second management information base.

4. A method according to claim 1, wherein the first management information and the difference information is stored in a single management information base.

5. A method according to claim 1, wherein the second configuration state is a future state of the network.

6. A method according to claim 5, further including testing a planned future configuration of the network.

7. A method according to claim 1, wherein the second configuration state is a past state of the network.

8. A method according to claim 1, wherein said first management information includes information about faults in the network.

9. A method according to claim 1, wherein said first management information includes information about network security.

10. A method according to claim 1, wherein said first management information includes accounting information.

11. A method according to claim 1, wherein said first management information includes information about performance of the network.

12. A communications network management system comprising:
   (i) a first memory arranged to store first management information in a first format which represents a first configuration state of the network;
   (ii) a processor arranged to generate difference information representing the differences between said first configuration state and a second configuration state of the network, the processor being further arranged to carry out said generation of said difference information without user intervention; and
   (iii) a second memory arranged to store information about said second configuration state of the network in the form of the said generated difference information;
   whereby the cumulative volume of data represented by the first management information and the difference information is reduced relative to the volume of data which would be required to store management information for the first and second configuration states using only the first format.

13. A management system according to claim 12, wherein said first memory comprises a first management information base and said second memory comprises a second management information base.

14. A management system according to claim 12, wherein the first and second memories are comprised in a single management information base which stores said management information about the first state of the network and said difference information.

15. A communications network including a communications network management system, the communications network management system comprising:
   (i) a first memory arranged to store first management information in a first format which represents a first configuration state of the network;
   (ii) a processor arranged to generate difference information representing the differences between said first configuration state and a second configuration state of the network, the processor being further arranged to carry out said generation of said difference information without user intervention; and (iii) a second memory arranged to store information about said second configuration state of the network in the form of the said generated difference information;

whereby the cumulative volume of data represented by the first management information and the difference information is reduced relative to the volume of data which would be required to store management information for the first and second configuration states using only the first format.

* * * * *